July 24, 1962
N. L. FRANCIS ET AL
3,045,886
APPARATUS FOR HANDLING A CONTINUOUS RAIL
Filed April 24, 1959
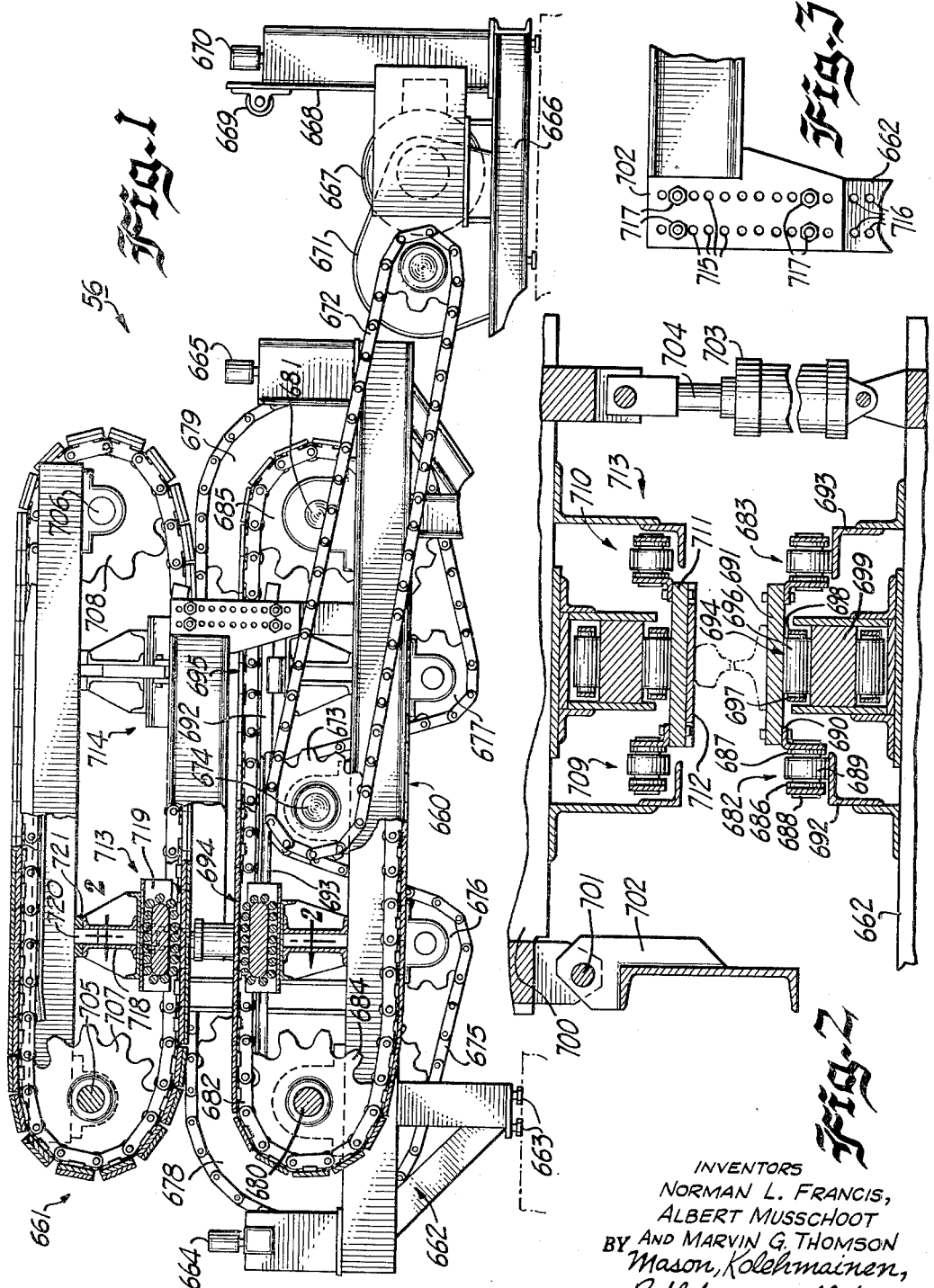
INVENTORS
NORMAN L. FRANCIS,
ALBERT MUSSCHOOT
AND MARVIN G. THOMSON
BY Mason, Kolehmainen,
Rathburn and Wyss
ATTORNEYS.

United States Patent Office 3,045,886
Patented July 24, 1962

3,045,886
APPARATUS FOR HANDLING A
CONTINUOUS RAIL
Norman L. Francis, Birmingham, Ala., Marvin G. Thomson, Chicago, Ill., and Albert Musschoot, Louisville, Ky., assignors to Chemetron Corporation, Chicago, Ill., a corporation of Delaware
Filed Apr. 24, 1959, Ser. No. 808,774
15 Claims. (Cl. 226—172)

The present invention relates generally to apparatus for handling a continuous rail and is more particularly concerned with a new and improved apparatus for moving a continuous rail in a system for welding together a plurality of individual rail sections in end to end relationship.

The rail handling apparatus of the present invention is particularly well suited for use in a rail forming system of the type described in detail in copending application Serial No. 808,786, now abandoned, of Robert A. Baer et al. which application is assigned to the same assignee as the present invention. In the system described in the latter application rail sections are supplied one at a time to a welding apparatus where they are joined to the trailing end of another such rail section. The upset surrounding the welded joint is then sheared and the continuous rail formed by the welds is passed through grinding equipment including a plurality of fixed, spaced apart grinding stations where the upset region is ground to produce a smooth weld surface. The continuous rail is then forced through a weld testing station and onto suitable rail receiving means which may take the form of a fixed storage rack or, alternatively, may comprise a train of flat cars located beyond the testing station. In any event, in order to draw the continuous rail through the welding and grinding equipment and to push it past the weld testing station and onto the rail receiving means, it is evident that a very large drive force must be applied to the rail. In addition, in the event that a defective weld is detected at the testing station it becomes necessary to back up the continuous rail so that the defective weld can be severed and replaced by a new weld. Thus, the drive for the continuous rail must be reversible and in both directions a large force must be available for moving the rail.

It is, therefore, an object of the present invention to provide a rail handling apparatus of the character described above which is capable of applying a very large driving force to the rail without at the same time creating undue stresses or strains upon the more fragile components making up the apparatus.

Another object of the invention is to provide rail handling apparatus wherein a large driving force is available both for moving the rail in a forward direction and for moving it in the reverse direction.

A further object of the invention is to provide rail handling apparatus wherein slight deviations in rail size or shape do not disturb the tractive force applied to the rail, thereby insuring that a large driving force is available at all times.

The invention has for another object the provision of apparatus of the type described above including means for adjusting the apparatus to handle rails of different height.

The foregoing and other objects are realized, in accordance with the present invention, by providing a rail handling apparatus including a drive tread acting upon the underside of the rail base and a squeeze tread seated on the top running surface of the rail for the purpose of urging or squeezing the rail against the drive tread. The drive tread is driven through a reversible assembly including a symmetrical serpentine arrangement which permits application of a large force to the drive tread in both directions of drive. The squeeze tread is urged against the rail by a plurality of piston and cylinder assemblies which apply a large force to the rail through a set of squeeze roller assemblies acting against the squeeze tread, through the rail, and against the drive tread. The drive tread is supported by drive roller assemblies which are respectively aligned with the squeeze roller assemblies so that all of the force applied to the rail is exerted across the roller assemblies and, as a consequence, the remaining components of the apparatus are not subjected to excessive stress or strain. The squeeze roller assemblies are supported upon float type mountings so that slight deviations in rail size or shape merely raise or lower one or more of these roller assemblies with the result that the tractive force applied to the rail is still distributed between the roller assemblies, thereby avoiding the possibility that the tractive force might become insufficient to drive the rail. Provision is made for adjusting the squeeze tread to permit the apparatus to handle rails of different height.

The invention, both as to its organization and method of operation, together with further objects and advantages thereof, will best be understood by reference to the specification, taken in conjunction with the accompanying drawing in which:

FIG. 1 is a fragmentary, side elevational view shown partly in cross section and illustrating a pusher mechanism characterized by the features of the present invention;

FIG. 2 is an enlarged fragmentary sectional view taken along a line substantially corresponding to the line 2—2 in FIG. 1 and showing particularly the coaction between the drive tread and the squeeze tread of the pusher mechanism to move the continuous rail; and FIG. 3 is a fragmentary view showing the adjustment for the squeeze tread to enable the pusher mechanism to handle rails of different height.

Referring now to the drawing and more particularly to FIG. 1 thereof, the pusher mechanism of the present invention is there identified generally by the reference numeral 56 and is adapted to act upon a continuous rail formed by a plurality of rail sections welded together in end to end relationship. This pusher mechanism comprises a driven endless tread 660 in engagement with the underside of the rail base and an upper idler or squeeze tread 661 engaging the top running surface of the rail. The lower tread may be selectively driven in either direction to advance or to back up the rail while the upper tread applies pressure for squeezing the rail to develop a tremendous traction of sufficient magnitude to handle very long rails which may reach a quarter mile in length. To this end, the lower tread is mounted upon a rigid support frame 662, the level of which may be adjusted by means of adjustable feet in the form of bolts 663. The bolts 663 are adjusted until the top run of the tread 660 as viewed in FIG. 1 is at the proper level for receiving the rail base. The frame 662 supports a pair of vertical guide rolls 664 at the entrance end of the pusher mechanism and a second pair of vertical guide rolls 665 at the exit end of the pusher mechanism. A base 666, which is preferably part of the main frame 662, supports a drive assembly for driving the lower tread 660. This base 666 also supports a mast 668 carrying a horizontally disposed roller 669 for engaging the underside of the base in order to support the continuous rail as it leaves the welding car. The mast 668 also supports a third pair of vertical guide rolls 670 disposed adjacent the bottom support roller 669. The three pairs of vertical guide rolls 664, 665, and 670 engage the side edges of the rail base to inhibit lateral movement of the rail and the mounting arrangement for these rolls is such that the rolls of each pair may be manually adjusted toward or away from each other in order to accommodate rails of different base widths and they may also be adjusted vertically to insure their proper engagement with the side edges of the rail base.

The drive assembly includes a reversible electric motor 667 connected through suitable reduction gearing 671 to drive a sprocket engaging a chain 672. The latter chain, in turn, engages a sprocket 673 mounted upon a shaft 674 rotatably journaled upon the main frame 662. The shaft 674 also carries a sprocket driving a chain 675 which forms what may be referred to as a symmetrical serpentine drive since it meshes with tensioning sprockets 676 and 677 and with large sprockets 678 and 679 respectively carried upon shafts 680 and 681 journaled upon the main frame 662. Each of the shafts 680 and 681 also carries a pair of spaced apart tread driving sprockets engaging endless single loop type chains 682 and 683 (FIG. 2) forming part of the drive tread 660. Only one of the two tread driving sprockets mounted upon the shaft 680 is visible in FIG. 1 and this is designated by the reference numeral 684. Similarly, only one of the tread driving sprockets mounted upon the shaft 681 is visible in FIG. 1 and it is designated by the reference character 685. As is best shown in FIG. 2, the chains 682 and 683 are similar in construction and each includes two parallel sets of links interconnected by shafts for supporting rollers which are disposed between the links. Thus, for example, one set of links for the chain 682 is indicated in FIG. 2 by the reference numeral 686 while the other or parallel set of links is designated as 687. Each pair of links in the set 686 is pivotally supported upon a shaft 688 which also pivotally supports a pair of links in the link set 687. A roller 689 having a diameter somewhat greater than the width of the links is carried upon the shaft 688 between the two link sets. Each of the links in the set 687 is provided with a shelf or platform 690 for supporting a hardened metal shoe or plate 691. Along one of its sides the shoe 691 is bolted or otherwise secured to the shelf 690 and along its other side it is similarly secured to a corresponding shelf formed on the chain 683.

When the motor 667 is rendered effective to drive the tread 660 the rollers of the two chains 682 and 683 roll along the top surfaces of horizontal angle arms 692 and 693 forming part of the frame 662. The shoes 691, on the other hand, are engaged and supported by a plurality of roller assemblies indicated by the reference numerals 694 and 695. Although two such roller assemblies are illustrated in FIG. 1, it should be understood that actually any number may be employed as required to provide sufficient support for the drive tread 660. Since the two roller assemblies 694 and 695 are identical, only the one assembly, namely the assembly 694 shown in FIG. 2, will be considered in detail. This roller assembly includes a plurality of elongated rollers 696 having their opposed ends connected together by a pair of parallel endless link arrangements 697 and 698. The rollers roll along a support block 699 carried upon suitable fixed support structure on the frame 662. This block includes flat upper and lower roller engaging surfaces and rounded ends for permitting endless movement of the rollers 696. Thus, when the tread 660 is driven by the motor 667, the shoes 691 roll along the rollers 696 to turn the latter and drive them over the surface of the block 699.

The squeeze or idler tread 661 is supported upon a frame 700 mounted for pivotal movement about pivot pins 701 (FIG. 2) carried by support structure 702 adjustably but rigidly secured to the main frame 662. The frame 700 is adapted to be moved about the pivot pins 701 by means of a plurality of piston and cylinder assemblies 703 having their lower ends pivotally supported upon the main frame 662. Fluid flow to these assemblies is preferably controlled by a common hand operated valve so that all of them may be actuated simultaneously. When the fluid under pressure is admitted to the bottom or lower ends of the piston and cylinder assemblies 703 as viewed in FIGS. 1 and 2, the piston rods 704 of these assemblies are extended to pivot the frame 700 about the pins 701 in a counterclockwise direction as viewed in FIG. 2, thus moving the squeeze tread 661 until it is free from the path of movement of the rail. When fluid under pressure is admitted to the upper ends of the piston and cylinder assemblies 703, the piston rods 704 are retracted and the frame 700 is pivoted about the pins 701 in a clockwise direction as viewed in FIG. 2, thereby causing the squeeze tread 661 to engage the top running surface of the continuous rail in order to squeeze it under very high pressure against the drive tread 660 so that a tremendous traction is exerted on the rail. When the reversible motor 667 is turned in the forward direction the tread driving sprocket 685 and the sprocket 679 on the shaft 681 serve as drive sprockets and they are driven in a clockwise direction as viewed in FIG. 1 to advance the chains 682 and 683 from left to right. However, when the motor 667 is reversed with the squeeze tread 661 applied, the tread driving sprockets 684 and the sprocket 678 on the shaft 680 provide the drive for the chains 682 and 683 and, since they are turned in a counterclockwise direction at this time, the chains and the rail section are moved from right to left. The symmetrical serpentine drive including the chain 675 permits the chains 682 and 683 to be driven by different sprockets when the motor is reversed and this is an important feature of the present invention.

The frame 700 carries bearing assemblies for supporting shafts 705 and 706 which mount pairs of drive sprockets engaging a pair of endless chains making up the squeeze belt 661. The two spaced apart drive sprockets mounted on the shaft 705 are indicated by the reference numeral 707 while those mounted upon the shaft 706 are indicated by the reference numeral 708. The two chains engaged by the sprockets 707 and 708 are respectively indicated in FIG. 2 by the reference numerals 709 and 710 and these chains are identical to the chains 682 and 683 previously described. The chains 709 and 710 support hardened plates or shoes 711 which, in turn, carry facing plates 712 formed of a material, such as aluminum, which is somewhat softer than the steel head of the rail 322 so that the very large pressure applied to the top running surface of the rail by the squeeze tread 661 will not damage the rail. At the same time, the use of a relatively soft facing plate upon the hard shoes 711 produces better gripping action between the squeeze tread 661 and the rail head. The shoes 711 roll along endless roller assemblies 713 and 714 which are supported upon the frame 700 and are similar to the roller assembly 694 previously described. The pressure exerted by the piston and cylinder assemblies 703 upon the frame 700 is transmitted to the drive tread 660 through the pressure roller assemblies 713 and 714, through the shoes and the facing plates of the tread 660 and through the rail itself.

In accordance with an important feature of the present invention the roller assembly 713 is vertically aligned with the roller assembly 694 and the roller assembly 714 is vertically aligned with the roller assembly 695 and, as a consequence, all of the pressure applied by the piston and cylinder assemblies 703 is exerted across the pairs of roller assemblies which have only relatively rigid metal parts interposed therebetween. Thus, this very high pressure can exert a large tractive force upon the rail without distorting or damaging the other components such as the chains of the upper and lower treads.

Another important advantage of the present invention resides in the mounting arrangement for the roller assemblies 713 and 714 of the squeeze treads 661. More specifically, each of these assemblies is floating upon or resiliently supported from the upper frame 700 so that the two roller assemblies may move slightly independently of each other in order to accommodate slight differences in rail size or minor deviations in the contour of the rail. Without this feature, one of the roller assemblies might supply all or a major portion of the pressure to the rail and, as a consequence, the traction might, under some circumstances, be insufficient to move the rail. The mounting arrangement for the roller assembly 713 is shown in FIG. 1 as including a column 718 secured at its lower end to suitable roller support structure 719. A post 720 depending downwardly from the upper frame 700 telescopes within the column 718 so that the support structure 719 is actually movable with respect to the frame. A resilient cushion 721 formed of rubber or the like surrounds the post 720 and is interposed between the top of the column and the underside of frame 700 in order to provide the floating mount referred to above. In view of the foregoing description, it will be apparent that slight changes in rail size or minor deviations in shape will cause one of the roller support structures of the assemblies 713 or 714 to rise against the resilient cushion so that the pressure applied to the rail is distributed substantially equally between the two roller assemblies 713 and 714, thus avoiding the disadvantages described above.

In order to adjust the squeeze tread for the purpose of handling rails of different height, the frame 702 is adjustably secured to the frame 700. As is shown in FIG. 3, this adjustment is effected by means of a series of holes 715 formed in the frame 702 and by a series of apertures 716 in the main frame. The spacing between the holes 715 obviously differs from that between the apertures 716 so that different ones of the holes 715 and apertures 716 may be aligned to receive securing bolts 717 in order to permit adjustment of the frame 702. Actually, two pairs of aligned holes 715 are employed at opposed ends of the frame 702 for cooperation with two pairs of aligned holes 716 although one end of the frame 702 and one set of holes is illustrated in FIG. 3, the remaining set being shown in FIG. 1. While the frame 702 may be adjusted to handle rails of different height both sides of the squeeze tread 661 remain parallel and in the same horizontal plane for each adjustment. Thus, the squeeze tread is never canted or inclined and its shoes 711 and facing plates 712 remain horizontal when the squeeze tread is applied.

The rail is pushed from the pusher mechanism 56 through the end of the rail welding car to a testing station which is preferably located on a flat car spaced from the end of the welding car. The testing station is preferably so located that a welded joint in the continuous rail will be located at the testing station when the butt end of the rail is in position to be welded to the next rail section. At the welding station, the welded joint is tested in any well known manner, as for example, by a magnaflux process wherein the welded joint is magnetized by a coil surrounding the continuous rail and the joint is dusted with ferromagnetic particles. If the welded joint is satisfactory, the dusted particles will have substantially uniform distribution while a non-uniform distribution is indicative of a defective weld which necessitates back-up of the rail by reversing the operation of the pusher mechanism. The back-up of the rail is, of course, accomplished by reversing the motor 667 of the pusher mechanism. The rail is backed up to permit the defective weld to be severed in the usual manner by employing an oxyacetylene torch either to cut the weld or to remove a section of the rail including the defective joint. The rail and the severed rail section are then backed up until they are centered in the welding apparatus and, at this time, they are joined by making a new weld.

The pusher mechanism 56 is effective to push the continuous rail through the testing station and onto a suitable rail receiving means, as for example, a train of flat cars. Alternatively, of course, the welded rail may be passed onto suitable storage racks. In either case, rails up to a quarter mile in length are formed and are stored upon the rail receiving means so that they can be transported to the area where they are to be used.

The motor 667 of the drive assembly for the pusher mechanism has associated therewith a spring set magnet brake (not shown) for accurately stopping the rail at the end of its advancement by the pusher mechanism. This motor is of the two-speed, constant torque alternating current type and, to this end, includes high speed windings and low speed windings which may be selectively energized in order to advance the rail in a forward direction either at high speed or at low speed. The rail can be backed up only at high speed.

While particular embodiments of the invention have been shown and described, it will be understood that many modifications will become readily apparent to those skilled in the art and it is, therefore, intended in the appended claims to cover any such modifications that fall within the true spirit and scope of the invention.

What is claimed as new and desired to be secured by Letters Patent of the United States is:

1. In an apparatus for moving an elongated rail the combination of an endless drive tread acting upon the underside of the rail, a squeeze tread acting upon the top of the rail, each of said treads being formed by a pair of parallel chains interconnected by a plurality of flat shoes, a facing plate secured to each of the shoes of the squeeze tread and formed of a material which is softer than the rail in order to prevent damaging the top running surface of the rail and to increase the traction between the squeeze tread and the rail, a frame supporting said drive tread, first and second spaced apart shafts rotatably supported upon the frame, a third shaft rotatably supported in fixed position upon the frame at a position intermediate said first and second shafts, a first idler sprocket supported on said frame at a position between the first and third shafts, a second idler sprocket supported on the frame at a position between the second and third shafts, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, a reversible drive motor operably connected to drive said third shaft whereby the drive is transmitted to the drive tread during either direction of rotation of the motor, a plurality of fixedly positioned spaced apart drive roller assemblies engaging the underside of the drive tread, a support carrying said squeeze tread and mounted for movement with respect to said frame, a plurality of spaced apart roller assemblies on said support respectively aligned vertically with the drive roller assemblies and in engagement with the squeeze tread, a plurality of piston and cylinder assemblies selectively operable to move said support in order to apply a force for urging said squeeze tread against the rail, the force being applied to the rail through the aligned roller assemblies, and a resilient cushioning mounting for each of said squeeze roller assemblies to permit slight movement of each squeeze roller assembly in response to changes in rail size.

2. In an apparatus for moving an elongated rail the combination of an endless drive tread acting upon the underside of the rail, a squeeze tread acting upon the top of the rail, a frame supporting said drive tread, first and second spaced apart shafts rotatably supported upon the frame, a third shaft rotatably supported upon the frame at a position intermediate said first and second shafts, a first idler sprocket supported on said frame at a position between the first and third shafts, a second idler sprocket supported on the frame at a position between the second and third shafts, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, a reversible drive motor operably connected to drive said third shaft whereby the drive is transmitted to the drive tread for either direction of rotation of the motor, a plurality of fixedly positioned spaced apart drive roller assemblies engaging the underside of the drive tread, a support carrying said squeeze tread and mounted for movement with respect to said frame, a plurality of spaced apart roller assemblies on said support respectively aligned vertically with the drive roller assemblies and in engagement with the squeeze tread, at least one piston and cylinder assembly selectively operable to move said support in order to apply a force for urging said squeeze tread against the rail, the force being applied to the rail through the aligned roller assemblies, and a resilient cushioning mounting for each of said squeeze roller assemblies to permit slight movement of each squeeze roller assembly in response to changes in rail size.

3. In an apparatus for moving an elongated rail the combination of an endless drive tread acting upon the underside of the rail, a squeeze tread acting upon the top of the rail, each of said treads being formed by a pair of parallel chains interconnected by a plurality of flat shoes, and a facing plate secured to each of the shoes of the squeeze tread and formed of a material which is softer than the rail in order to prevent damaging the top running surface of the rail and to increase the traction between the squeeze tread and the rail, a frame supporting said drive tread, first and second spaced apart shafts rotatably supported upon the frame, a third shaft rotatably supported upon the frame, first and second idler sprockets supported on said frame, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, a reversible drive motor operably connected to drive said third shaft whereby the drive is transmitted to the drive tread for either direction of rotation of the motor, a plurality of fixedly positioned spaced apart drive roller assemblies engaging the underside of the drive tread, a support carrying said squeeze tread and mounted for movement with respect to said frame, a plurality of spaced apart roller assemblies on said support respectively aligned vertically with the drive roller assemblies and in engagement with the squeeze tread, and at least one piston and cylinder assembly selectively operable to move said support in order to apply a force for urging said squeeze tread against the rail, the force being applied to the rail through the aligned roller assemblies.

4. In an apparatus for moving an elongated rail the combination of an endless drive tread acting upon the underside of the rail, a squeeze tread acting upon the top of the rail, a frame supporting said drive tread, first and second spaced apart shafts rotatably supported upon the frame, a third shaft rotatably supported upon the frame, first and second idler sprockets supported on said frame, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, a reversible drive motor operably connected to drive said third shaft whereby the drive is transmitted to the drive tread during either direction of rotation of the motor, at least one drive roller assembly on the frame and in engagement with the underside of the drive tread, a support carrying said squeeze tread and mounted for movement with respect to said frame, at least one roller assembly on said support in engagement with the squeeze tread, and at least one piston and cylinder assembly selectively operable to move said support in order to apply a force through the roller assemblies for urging said squeeze tread against the rail.

5. In an apparatus for moving an elongated rail the combination of a drive tread acting upon the underside of the rail base, a squeeze tread acting upon the top of the rail to urge the rail against the drive tread, each of said treads being formed by a pair of parallel chains interconnected by a plurality of shoes, a facing plate secured to each of the shoes of the squeeze tread and formed of a material which is softer than the rail in order to prevent damaging the top running surface, a plurality of fixedly positioned spaced apart drive roller assemblies engaging the underside of the drive tread, a movable frame carrying said squeeze tread, a plurality of spaced apart roller assemblies on said frame respectively aligned vertically with the drive roller assemblies and in engagement with the squeeze tread, and at least one piston and cylinder assembly selectively operable to move said frame in order to apply a force for urging said squeeze tread against the rail, the force being applied to the rail through the aligned roller assemblies.

6. In an apparatus for moving an elongated rail the combination of a drive tread acting upon the underside of the rail base, a squeeze tread acting upon the top of the rail to urge the rail against the drive tread, each of said treads being formed by a pair of parallel chains interconnected by a plurality of metal shoes, a reversible drive means for selectively turning said drive tread in either direction and including pairs of spaced apart sprockets engaging the chains and with the sprockets of each pair being mounted upon a common shaft, at least one drive roller assembly engaging the underside of the drive tread, a movable frame carrying said squeeze tread, at least one squeeze roller assembly on said frame in engagement with the squeeze tread and vertically aligned with the drive roller assembly, said drive roller assembly and said squeeze roller assembly being dimensioned to occupy only a small portion of the space between said pairs of sprockets, at least one piston and cylinder assembly selectively operable to move said frame in order to apply a force for urging said squeeze tread against the rail with the force being concentrated in the very small area occupied by the drive roller assembly and the squeeze roller assembly, and a resilient cushioning mounting for the squeeze roller assembly to permit slight movement of the latter assembly upon the frame in response to deviations in rail size.

7. In an apparatus for moving an elongated rail the combination of an endless drive tread acting upon the underside of the rail, means including a squeeze tread acting upon the top of the rail for urging the rail against the drive tread, a frame supporting both of said treads, first and second spaced apart shafts rotatably supported upon the frame, a third shaft rotatably supported upon the frame at a fixed position intermediate said first and second shafts, a first idler sprocket supported on said frame at a position between the first and third shafts, a second idler sprocket supported on the frame at a position between the second and third shafts, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, and a reversible drive motor operably connected to drive said third shaft whereby the drive is transmitted to the drive tread for either direction of rotation of the motor.

8. In an apparatus for moving an elongated rail the combination of a drive tread acting upon the underside of the rail base, a squeeze tread acting upon the top of the rail to urge the rail against the drive tread, each of said treads being formed by a pair of parallel chains interconnected by a plurality of metal shoes, and a facing plate secured to each of the metal shoes of the squeeze tread and formed of a material which is softer than the rail in order to prevent damaging the top running surface of the rail and to increase the traction between the squeeze tread and the rail.

9. The apparatus defined by claim 8 wherein the facing plates are formed of aluminum.

10. In an apparatus for moving an elongated rail the combination of an endless drive tread acting upon the underside of the rail, a squeeze tread acting upon the top of the rail, each of said treads being formed by a pair of parallel chains interconnected by a plurality of flat shoes, a facing plate secured to each of the shoes of the squeeze tread and formed of a material which is softer than the rail in order to prevent damaging the top running surface of the rail and to increase the traction between the squeeze tread and the rail, a frame supporting said drive tread, first and second spaced apart shafts rotatably supported upon the frame, a third shaft rotatably supported upon the frame at a fixed position intermediate said first and second shafts, a first idler sprocket supported on said frame at a position between the first and third shafts, a second idler sprocket supported on the frame at a position between the second and third shafts, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, a reversible drive motor operably connected to drive said third shaft whereby the drive is transmitted to the drive tread during either direction of rotation of the motor, a plurality of fixedly positioned spaced apart drive roller assemblies engaging the underside of the drive tread, a support carrying said squeeze tread and mounted for pivotal movement upon said frame about a horizontal axis extending parallel to and displaced laterally of said drive tread, a plurality of spaced apart roller assemblies on said support respectively aligned vertically with the drive roller assemblies and in engagement with the squeeze tread, at least one piston and cylinder assembly connected between said support and said frame on the other side of the drive tread from the pivot axis of the support and operable to pivot said support about said axis in order to apply a force for urging said squeeze tread against the rail, the force being applied to the rail through the aligned roller assemblies, and a resilient cushioning mounting for each of said squeeze roller assemblies to permit slight movement of each squeeze roller assembly in response to changes in rail size.

11. The apparatus defined by claim 10 wherein manually operated means are provided for adjusting the support upon the frame in order to permit the apparatus to handle rails of different height.

12. In an apparatus for moving an elongated rail the combination of an endless drive tread acting upon the underside of the rail, a squeeze tread acting upon the top of the rail, a frame supporting said drive tread, first and second spaced apart shafts rotatably supported upon the frame, a third shaft rotatably supported upon the frame at a fixed position intermediate said first and second shafts, a first idler sprocket supported on said frame at a position between the first and third shafts, a second idler sprocket supported on the frame at a position between the second and third shafts, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, a reversible drive motor operably connected to drive said third shaft whereby the drive is transmitted to the drive tread for either direction of rotation of the motor, a plurality of fixedly positioned spaced apart drive roller assemblies engaging the underside of the drive tread, a support carrying said squeeze tread and mounted for pivotal movement upon said frame about a horizontal axis extending parallel to and displaced laterally from the drive tread, a plurality of spaced apart roller assemblies on said support respectively aligned vertically with the drive roller assemblies and in engagement with the squeeze tread, at least one piston and cylinder assembly connected between the frame and the support and operable to pivot said support about said axis in order to apply a force for urging said squeeze tread against the rail, the force being applied to the rail through the aligned roller assemblies, and a resilient cushioning mounting for each of said squeeze roller assemblies to permit slight movement of each squeeze roller assembly in response to changes in rail size.

13. The apparatus defined by claim 12 wherein manually operated means are provided for adjusting the support upon the frame in order to permit the apparatus to handle rails of different height.

14. In an apparatus for moving an elongated rail the combination of an endless drive tread acting upon the underside of the rail, a squeeze tread acting upon the top of the rail, a frame supporting said drive tread, first and second spaced apart shafts rotatably supported upon the frame, a third shaft rotatably supported in fixed position upon the frame, first and second idler sprockets supported on said frame, first and second drive sprockets respectively mounted upon said first and second shafts and engaging said drive tread, third and fourth drive sprockets respectively mounted upon said first and second shafts, a fifth drive sprocket mounted on the third shaft, an endless chain trained over said third, fourth and fifth drive sprockets and over said first and second idler sprockets, a reversible drive motor operably connected to drive said third shaft whereby the drive is transmitted to the drive tread during either direction of rotation of the motor, at least one drive roller assembly on the frame and in engagement with the underside of the drive tread, a support carrying said squeeze tread and pivotally mounted upon said frame for movement about a horizontal axis extending parallel to and laterally displaced from said drive tread, at least one roller assembly on said support in engagement with the squeeze tread, and at least one piston and cylinder assembly connected between said frame and said support and operable to pivot said support about said axis in order to apply a force through the roller assemblies for urging said squeeze tread against the rail.

15. The apparatus defined by claim 14 wherein manually operated means are provided for adjusting the support upon the frame in order to permit the apparatus to handle rails of different height.

References Cited in the file of this patent

UNITED STATES PATENTS

| | | |
|---|---|---|
| 814,987 | Richardson | Mar. 13, 1906 |
| 1,223,107 | Quade | Apr. 17, 1917 |
| 1,321,463 | Lloyd | Nov. 11, 1919 |
| 1,659,733 | Harbeck | Feb. 21, 1928 |
| 1,999,151 | Finley | Apr. 23, 1935 |
| 2,212,132 | Shear | Aug. 20, 1940 |
| 2,438,448 | Morton et al. | Mar. 23, 1948 |
| 2,679,924 | Powell | June 1, 1954 |
| 2,797,798 | Hallden | July 2, 1957 |
| 2,884,120 | Bruestle | Apr. 28, 1959 |
| 2,981,452 | Baker et al. | Apr. 25, 1961 |
| 2,981,454 | Dickinson et al. | Apr. 25, 1961 |